US009097571B2

(12) United States Patent
Phipps et al.

(10) Patent No.: US 9,097,571 B2
(45) Date of Patent: Aug. 4, 2015

(54) SYSTEMS, METHODS, AND ASSEMBLIES FOR FILLING DISPENSERS WITH SEMILIQUID MATERIALS

(75) Inventors: Timothy Gayle Phipps, Woodstock, GA (US); Daniel Lee DeYoung, Woodstock, GA (US); Craig Jay Cochran, Atlanta, GA (US); John Boezi, Atlanta, GA (US)

(73) Assignee: Custom Rx TDA, LLC, Woodstock, GA (US)

( * ) Notice: Subject to any disclaimer, the term of this patent is extended or adjusted under 35 U.S.C. 154(b) by 767 days.

(21) Appl. No.: 13/398,121

(22) Filed: Feb. 16, 2012

(65) Prior Publication Data

US 2012/0205000 A1 Aug. 16, 2012

Related U.S. Application Data (60) Provisional application No. 61/443,557, filed on Feb. 16, 2011.

(51) Int. Cl.
*B65B 1/04* (2006.01)
*G01F 11/02* (2006.01)
*B65D 83/00* (2006.01)
*G01F 11/04* (2006.01)

(52) U.S. Cl.
CPC .......... *G01F 11/025* (2013.01); *B65D 83/0033* (2013.01); *G01F 11/04* (2013.01)

(58) Field of Classification Search
CPC ............ B65D 83/0005; B65D 83/0033; G01F 11/021; G01F 11/04; F16N 3/12; B05C 17/01; B05C 17/00576
USPC ................................ 222/325–327; 141/18, 2
See application file for complete search history.

(56) References Cited

U.S. PATENT DOCUMENTS 5,263,614 A * 11/1993 Jacobsen et al. .............. 222/137
5,297,702 A * 3/1994 Crosby et al. .............. 222/185.1

* cited by examiner

*Primary Examiner* — Jason K Niesz
(74) *Attorney, Agent, or Firm* — Kilpatrick Townsend & Stockton LLP (57) ABSTRACT

Described are filling station assemblies for filling dispensers with semiliquid materials, wherein the filling station assemblies include a housing with a drive system and a brake assembly, a shaft releasably coupled to the drive system and adjacent the brake assembly, and a push rod coupled to the shaft. The drive system includes a leveraging plate that is configured to couple to the shaft so as to lower the shaft and push rod from a rest position to an advanced position when a driving force is applied to the drive system. The brake assembly includes a friction surface that is configured to maintain the shaft and push rod in the advanced position when the driving force is removed from the drive system such that the shaft is released from the drive system.

16 Claims, 8 Drawing Sheets

SYSTEMS, METHODS, AND ASSEMBLIES FOR FILLING DISPENSERS WITH SEMILIQUID MATERIALS

CROSS REFERENCE TO RELATED APPLICATIONS

This application is related to and claims priority benefits from U.S. Provisional Application Ser. No. 61/443,557, filed on Feb. 16, 2011, entitled "Systems, Methods and Apparatus for Filing Medicament Dispensers." The '557 application is hereby incorporated in its entirety by this reference.

FIELD OF THE INVENTION

The field of the invention relates to dispensers. More specifically, it relates to the filling of dispensers with a semiliquid material.

BACKGROUND

U.S. Pat. Nos. 7,213,994 and 7,303,348 to Phipps et al. describe medicament, and other semiliquid material, dispensers, such as dispensers for metered dosing of cream-based medicines. "Compounding" pharmacists have used these dispensers for metered dosages of creams and other types of semiliquid materials that have been custom tailored to a particular patient (e.g., a custom mixture of different hormones or other medicines prepared in accordance with a prescription tailored to the needs of a particular patient).

Existing methods and devices for filling these, and other, dispensers at a pharmacy are undesirable, inefficient, and otherwise problematic. The creams and other types of semiliquid materials utilized in these dispensers are typically achieved through the use of a mortar and pestle. When using a traditional mortar and pestle, the resulting semiliquid material is typically transferred into the dispenser by a spoon or spatula. Alternatively, the cream or semiliquid material can also be achieved through the use of an electronic mortar and pestle ("EMP"), in which the semiliquid material is realized in a jar, commonly referred to as an "EMP jar," through the use of an electric-powered mortar or hammer. From the EMP jar, the semiliquid material may then be squirted or pushed out of the jar and into the dispenser via a lid of the jar through the application of force to a compressible floor of the jar. Both methods, however, require a certain amount of energy and dexterity on behalf of the pharmacist. These requirements are further amplified on days in which a pharmacist must fill upwards of 200 such dispensers. Such filling may physically exhaust or drain a pharmacist, in addition to monopolizing valuable time.

Embodiments of the present invention provide improved systems, methods, and assemblies for at least semi-automated filling of dispensers, so as to save the user time and energy, while increasing the overall ease and efficiency of filling such dispensers.

SUMMARY

Certain embodiments of the present invention include a filling station assembly comprising a housing comprising a drive system and a brake assembly, a shaft releasably coupled to the drive system and adjacent the brake assembly, and a push rod coupled to the shaft. In some embodiments, the filling station assembly further comprises a dispensing platform.

In some embodiments, the drive system comprises a leveraging plate that is configured to couple to the shaft so as to lower the shaft and push rod from a rest position to an advanced position when a driving force is applied to the drive system. In some embodiments, the brake assembly comprises a friction surface that is configured to maintain the shaft and push rod in the advanced position when the driving force is removed from the drive system such that the shaft is released from the drive system. The friction surface may be positioned to apply a frictional force against a surface of the shaft.

In some embodiments, the brake assembly comprises a support bracket and a friction surface. In some embodiments, the brake assembly may further comprise a tensioning mechanism. In some embodiments, the brake may be adjustable.

Other embodiments of the present invention include a system comprising a filling station assembly, a dispensing container, and a dispenser. Other embodiments of the present invention include a method of filling a dispenser through the use of a filling station assembly.

DETAILED DESCRIPTION

Embodiments of the invention provide systems, methods, and assemblies for filling dispensers. While the systems, methods, and assemblies are generally discussed for use with dispensers of compounded semiliquid materials, they are by no means so limited. Rather, embodiments of the invention may be used in connection with any type of dispenser, including tubes and syringes, that dispenses semiliquid materials, which may or may not contain medicine, including but not limited to ointments, creams, salves, balms, pastes, gels, emulsions, lotions, unguents, unctions, and any other semiliquid material with a viscosity greater than water.

Figure 1:
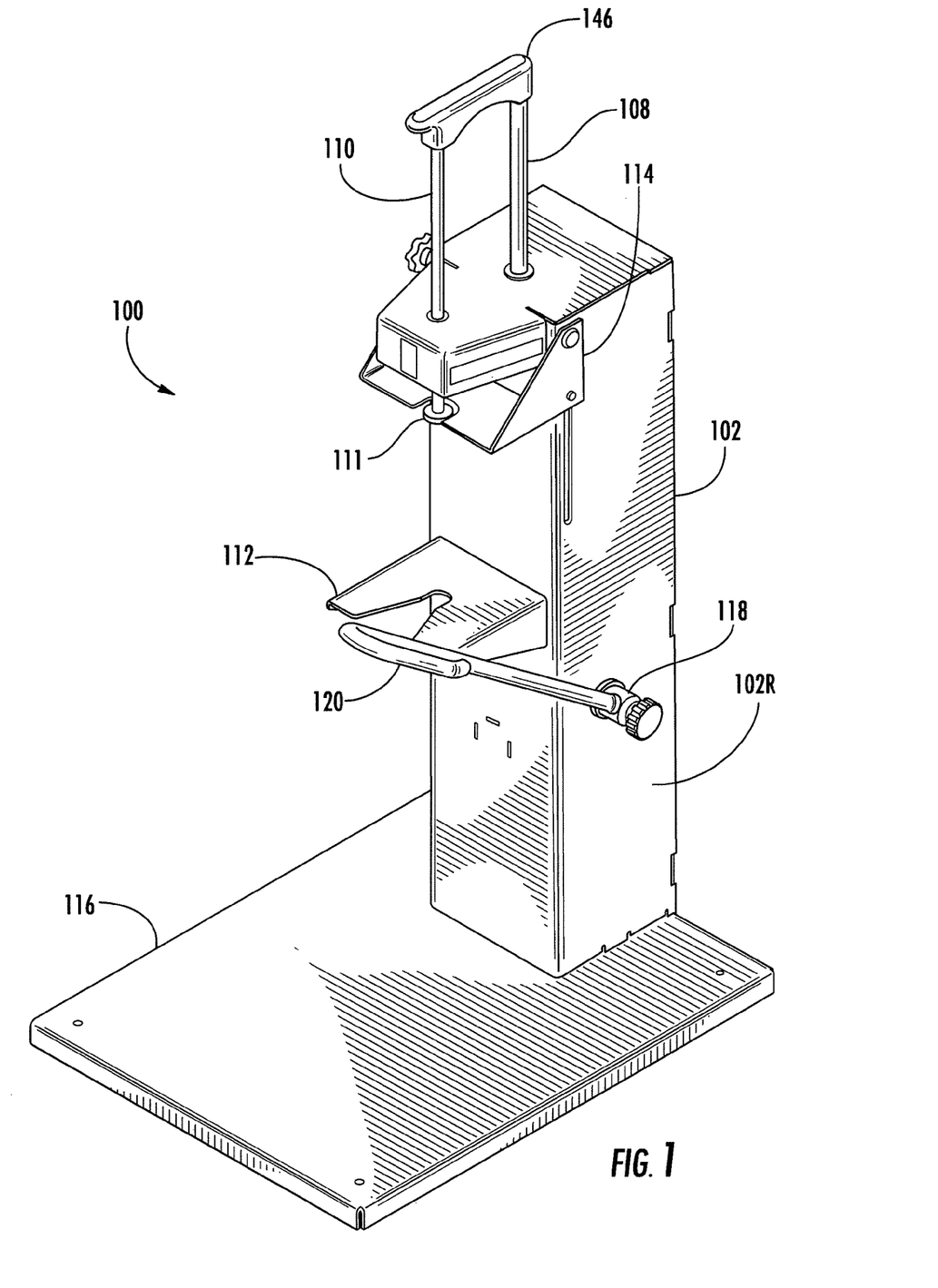
FIG. 1 is a perspective view of an assembly according to certain embodiments of the present invention.

FIG. 1 illustrates embodiments of a filling station assembly 100. In these embodiments, the assembly 100 may comprise a housing 102 comprising a drive system 104 and a brake assembly 106, a shaft 108, and a push rod 110. In some embodiments, the assembly 100 may further comprise a dispensing platform 112. In some embodiments, the assembly 100 may further comprise at least one holding bracket 114. In some embodiments, the assembly 100 may further comprise a base 116. FIGS. 2-8 illustrate embodiments of a filling station assembly 100 in conjunction with a dispensing container 202 and/or a dispenser 204. In some embodiments, the assembly 100 may also be used in conjunction with a removable nozzle 206.

The housing 102 serves as the foundation of the assembly 100, housing at least a portion of the drive system 104 and the brake assembly 106. The housing 102 may be formed from a variety of materials, including but not limited to aluminum, steel, other metallic materials, composite materials, plastics, or other similar materials. In some embodiments, the housing 102 may include a back panel. In some embodiments, a height of the housing 102 may be adjusted by an adjusting mechanism 103.

Figure 2:
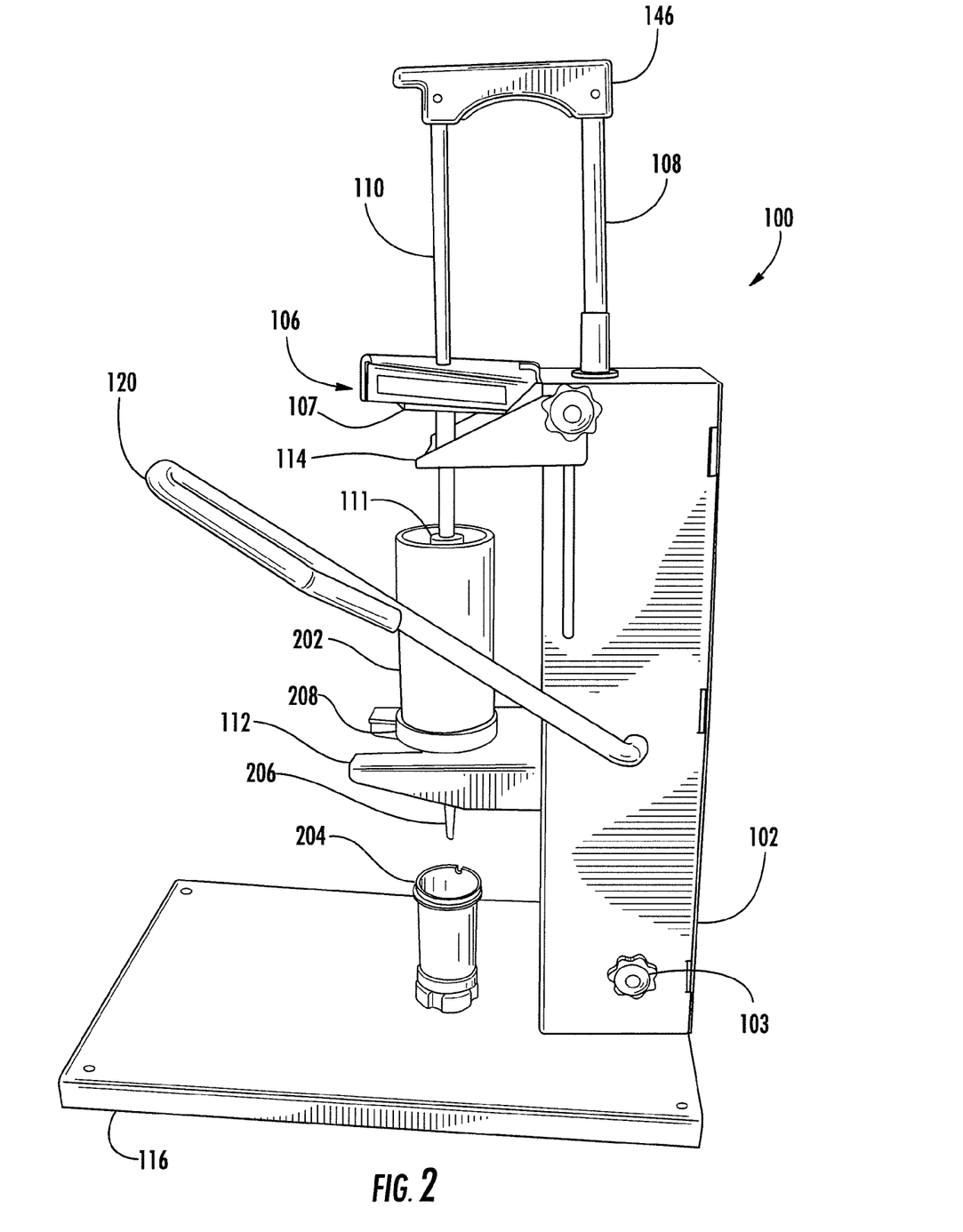
FIG. 2 is a perspective view of an assembly according to certain embodiments of the present invention in conjunction with a dispensing container, a nozzle, and a dispenser.
Figure 3:
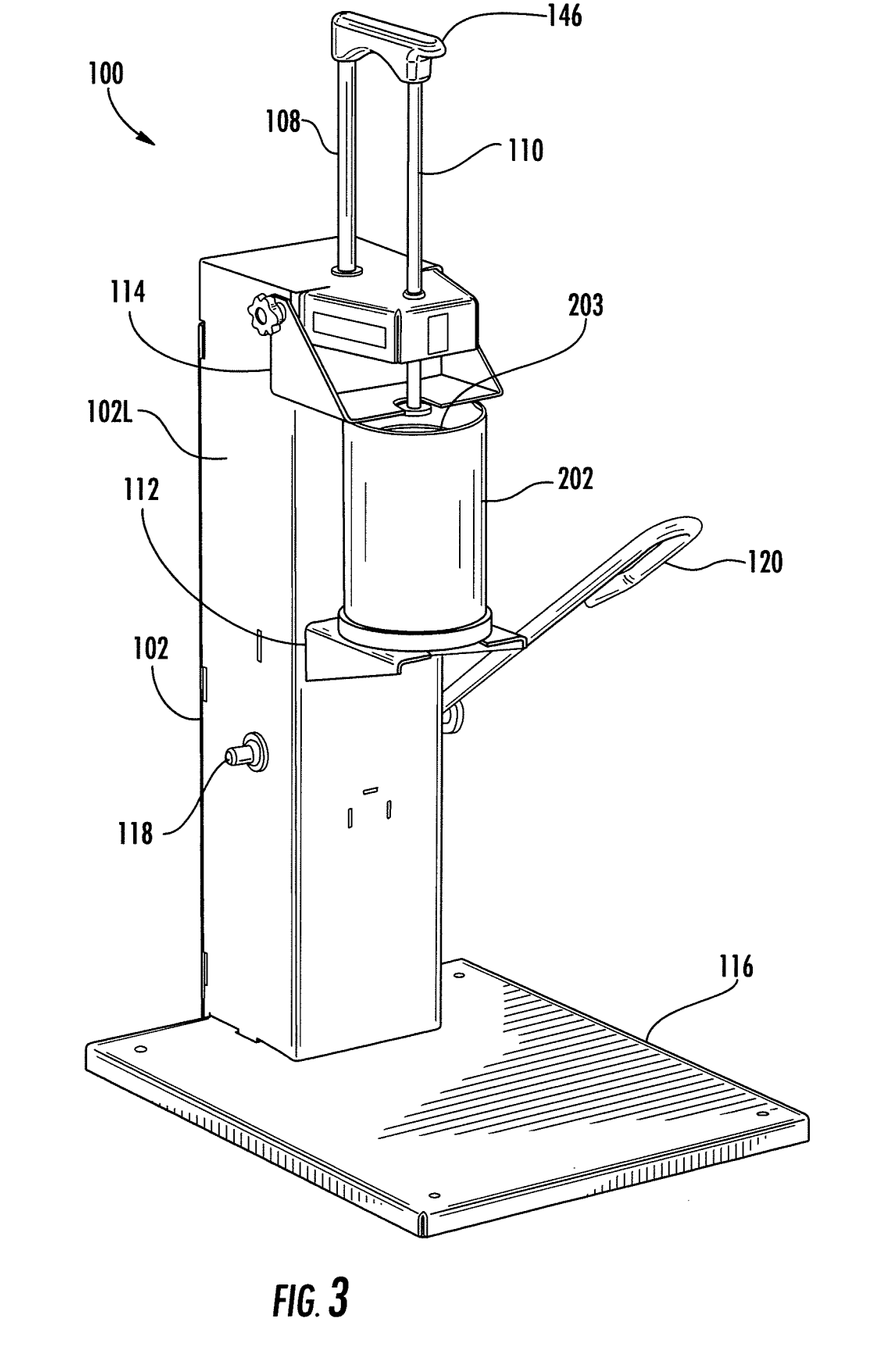
FIG. 3 is a perspective view of an assembly according to certain embodiments of the present invention in conjunction with a dispensing container.
Figure 4:
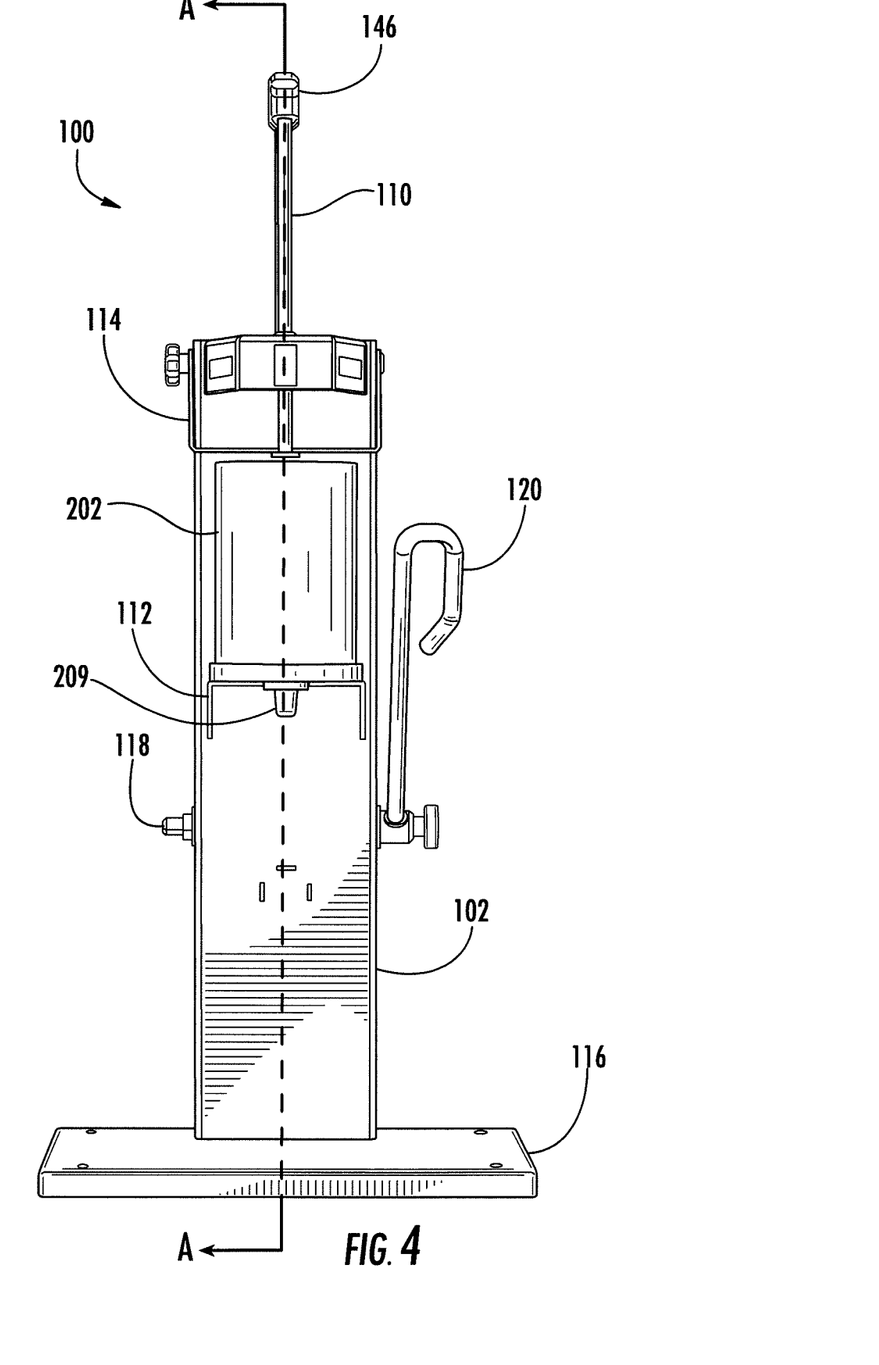
FIG. 4 is a front view of the assembly of FIG. 3.
Figure 5:
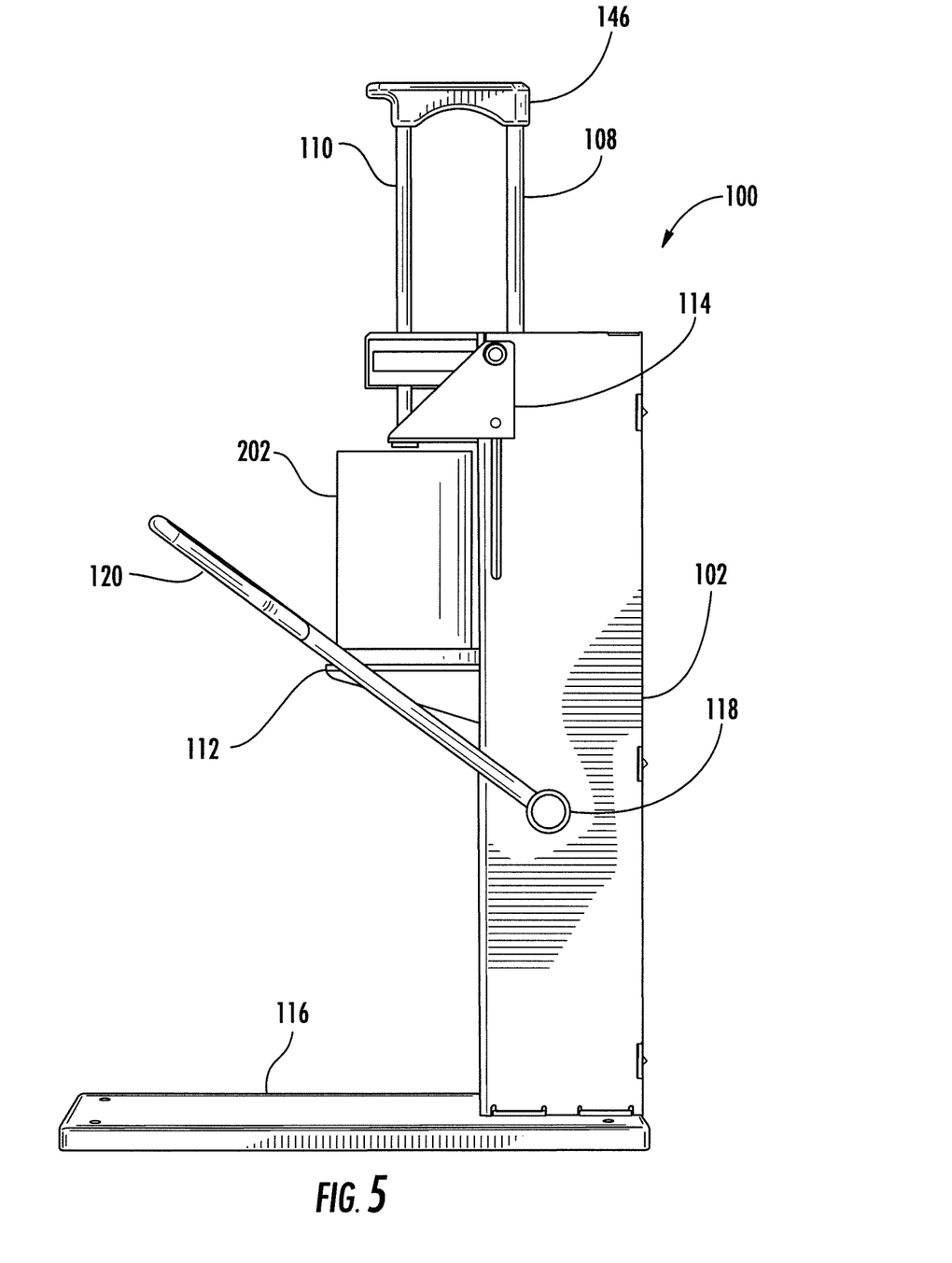
FIG. 5 is a side view of the assembly of FIG. 3.

In some embodiments, such as the embodiments illustrated in FIGS. 1-8, the housing 102 may be coupled to the base 116. The base 116 may be formed from a variety of materials, including but not limited to aluminum, steel, other metallic materials, composite materials, plastics, or other similar materials. In these embodiments, the housing 102 may be coupled to the base 116 through a variety of mechanisms, including but not limited to an adhesive, bolts, fasteners, screws, and other coupling mechanisms. In some embodiments, the base 116 may be removably coupled to the housing 102. In other embodiments, the base 116 may be integrally formed with the housing 102. The base 116 may provide an expanded footprint for the assembly 100. In some embodiments, as shown in FIG. 2, the base 116 may provide a resting surface for the dispenser 204.

The drive system 104 may be configured to move the shaft 108 downward when a driving force is applied to the drive system 104 (so as to transition the drive system 104 to an engaged position). In these embodiments, the shaft 108 may be releasably coupled to the drive system 104 so as to be coupled to the drive system 104 when the drive system 104 is engaged, and not coupled to the drive system 104 when the drive system 104 is not engaged. Throughout embodiments, the drive system 104 may comprise one or more mechanisms that are configured to cause a downward displacement of the shaft 108. The drive system 104 may be mechanical, electrical, a combination thereof, or otherwise automated. For example, in the embodiments illustrated in FIGS. 6-8, the drive system 104 may comprise an axis member 118, a dispensing mechanism 120, a resistance mechanism 122, a drive frame 124 comprising a drive bar 126, a leverage plate 128, a biasing mechanism 130, and a biasing platform 132. However, one of ordinary skill in the relevant art will understand that the drive system 104 may comprise one or more other mechanisms, or combinations thereof, in addition to, or separate and distinct from, the components listed above.

In these embodiments, the axis member 118 may be rotatably coupled to the housing 102 such that it may be rotated relative to the housing 102. In these embodiments, the axis member 118 may be rotatably coupled to the housing 102 through a variety of mechanisms, including but not limited to mechanical bearings, such as ball bearings or roller bearings, magnetic bearings, bushings, and other suitable coupling mechanisms. The axis member 118 may be formed from a variety of materials, including but not limited to aluminum, steel, other metallic materials, composite materials, plastics, or other similar materials.

In certain embodiments, the dispensing mechanism 120 may be fixedly coupled to the axis member 118. As a result, movement of the dispensing mechanism 120 induces a corresponding rotation of the axis member 118, thereby transitioning the drive system 104 in an engaged position, as explained in more detail below. In these embodiments, the dispensing mechanism 120 may be coupled to the axis member 118 through a variety of mechanisms, including but not limited to an adhesive, bolts, fasteners, screws, and other coupling mechanisms. In some embodiments, the axis member 118 may protrude from a side of the housing 102, such that the dispensing mechanism 120 may be coupled to the axis member 118 at a position external from the housing 102. In these embodiments, such as the embodiments illustrated in FIG. 1, the dispensing mechanism 120 may be coupled to the axis member 118 at a position proximate to a right side 102R of the housing 102. In other embodiments, the dispensing mechanism 120 may be coupled to the axis member 118 at a position proximate to a left side 102L of the housing 102. In some embodiments, the dispensing mechanism 120 may be releasably coupled to the axis member 118. In some embodiments, the dispensing mechanism 120 may be integrally formed with the axis member 118. The dispensing mechanism 120 may be formed from a variety of materials, including but not limited to aluminum, steel, other metallic materials, composite materials, plastics, or other similar materials. In some embodiments, such as the embodiments illustrated in FIGS. 1-8, the dispensing mechanism 120 may be a lever arm. One of ordinary skill in the relevant art will understand that examples of suitable dispensing mechanisms 120 may include but are, not limited to arms, knobs, handle, and other suitable mechanisms. In the embodiments illustrated in FIGS. 1-8, a downward pull of the dispensing mechanism 120 may result in rotation of the axis member 118 and engagement of the drive system 104.

In these embodiments, the axis member 118 passes through an opening 125 within the body of the drive frame 124. The opening 125 is shaped so that the drive frame 124 is fixedly coupled to the axis member 118. As a result, rotation of the axis member 118 to also causes a corresponding movement of the drive frame 124. One of ordinary skill in the relevant art understand that the drive frame 124 may be coupled to the axis member 118 through a variety of other mechanisms, including but not limited to an adhesive, bolts, fasteners, screws, and other coupling mechanisms. In other embodiments, the drive frame 124 may be integrally formed with the axis member 118. The drive frame 124 may be formed from a variety of materials, including but not limited to aluminum, steel, other metallic materials, composite materials, plastics, or other similar materials.

In these embodiments, the drive bar 126 of the drive frame 124 may be positioned proximate a side of the shaft 108 so that at least a portion of the shaft 108 is enclosed between the drive bar 126, the drive frame 124, and the axis member 118. Because the drive bar 126 is fixedly coupled to the drive frame 124, movement of the drive frame 124 induces a corresponding movement of the drive bar 126. In these embodiments, the drive bar 126 may be coupled to the drive frame 124 through a variety of mechanisms, including but not limited to an adhesive, bolts, fasteners, screws, and other coupling mechanisms. In other embodiments, the drive bar 126 may be integrally formed with the drive frame 124. The drive bar 126 may be formed from a variety of materials, including but not limited to aluminum, steel, other metallic materials, composite materials, plastics, or other similar materials.

In these embodiments, the leverage plate 128 may comprise an opening 134 that is configured to receive the shaft 108. The leverage plate 128 may be formed from a variety of materials, including but not limited to aluminum, steel, other metallic materials, composite materials, plastics, or other similar materials. The opening 134 through the leverage plate 128 may be configured so that the leverage plate 128 does not prevent the shaft 108 from moving relative to the leverage plate 128 when the leverage plate 128 is positioned at a substantially perpendicular angle relative to the shaft 108 (the "free position"), but so that the leverage plate 128 does substantially prevent the shaft 108 from moving relative to the leverage plate 128 when the leverage plate 128 is positioned at one or more other angles relative to the shaft 108 (an "engaged position"). For example, in the embodiments illustrated in FIG. 8, the leverage plate 128 is in the free position (or substantially perpendicular to the shaft 108) so that the leverage plate 128 does not restrict the relative movement of the shaft 108. In these embodiments, such as the embodiments illustrated in FIGS. 6-8, the opening 134 may have any suitable cross-sectional shape that allows the leverage plate 128 to achieve at least one free position and at least one engaged position, including but not limited to cylindrical, rectilinear, trapezoidal, or other similar polygon shape.

In these embodiments, the shaft 108 may pass through the opening 134 at a position such that when the drive system 104 is engaged, the drive bar 126 is engaged so as to apply a downward force to a top surface of the leverage plate 128. When such a force is applied, the leverage plate 128 is moved from a free position to an engaged position relative to the shaft 108 and moved downward relative to the housing 102. In these embodiments, the shaft 108 is releasably coupled to the leverage plate 128 so as to be coupled to the leverage plate 128 when the leverage plate 128 is in an engaged position, and not coupled to the leverage plate 128 when the leverage plate 128 is in the free position. In the engaged position, an edge 135 of the opening 134 contacts the shaft 108 and grips the shaft 108 so that the shaft 108 also moves downward with the leverage plate 128. In these embodiments, such as the embodiments illustrated in FIGS. 6-8, the leverage plate 128 may have any suitable cross-sectional shape that allows the leverage plate 128 to receive a downward force from the drive bar 126, including but not limited to cylindrical, rectilinear, trapezoidal, or other similar polygon shape. Thus, in the embodiments illustrated in FIGS. 6-8, the drive system 104 may be configured such that when the drive system 104 is engaged, the drive bar 126 of the drive frame 124 applies a downward force to the leverage plate 128 so that the leverage plate 128 transitions from a free position to an engaged position, thereby translating into a corresponding downward displacement of the shaft 108.

Figure 7:
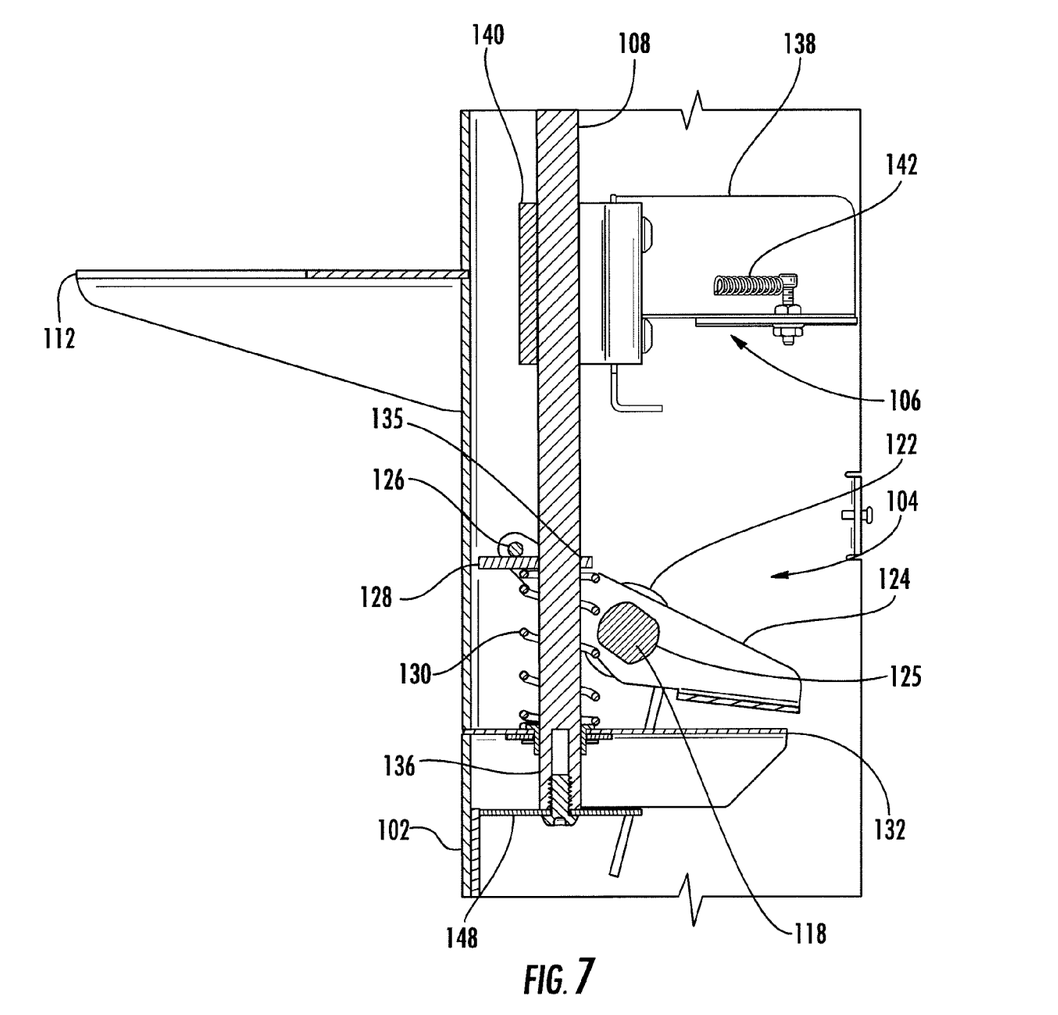
FIG. 7 is a cross-sectional side view of the assembly of FIG. 3 taken at inset A.

In these embodiments, a bottom surface of the leverage plate 128 rests atop the biasing mechanism 130. The biasing mechanism 130 is contained between a bottom surface of the leverage plate 128 and the biasing platform 132 of the drive system 104. The biasing platform 132 may be formed from a variety of materials, including but not limited to aluminum, steel, other metallic materials, composite materials, plastics, or other similar materials. The biasing platform 132 may be coupled to the housing 102 through a variety of mechanisms, including but not limited to an adhesive, bolts, fasteners, screws, and other coupling mechanisms. In these embodiments, the biasing platform 132 may have any suitable general surface shape to contact the biasing mechanism 130, including but not limited to cylindrical, rectilinear, trapezoidal, or other similar polygon shape. In some embodiments, as illustrated in FIG. 7, the biasing platform 132 comprises a platform opening 136 configured to allow the shaft 108 to travel freely through the biasing platform 132. In these embodiments, the platform opening 136 may have any suitable cross-sectional shape including but not limited to cylindrical, rectilinear, trapezoidal, or other similar polygon shape.

Figure 6:
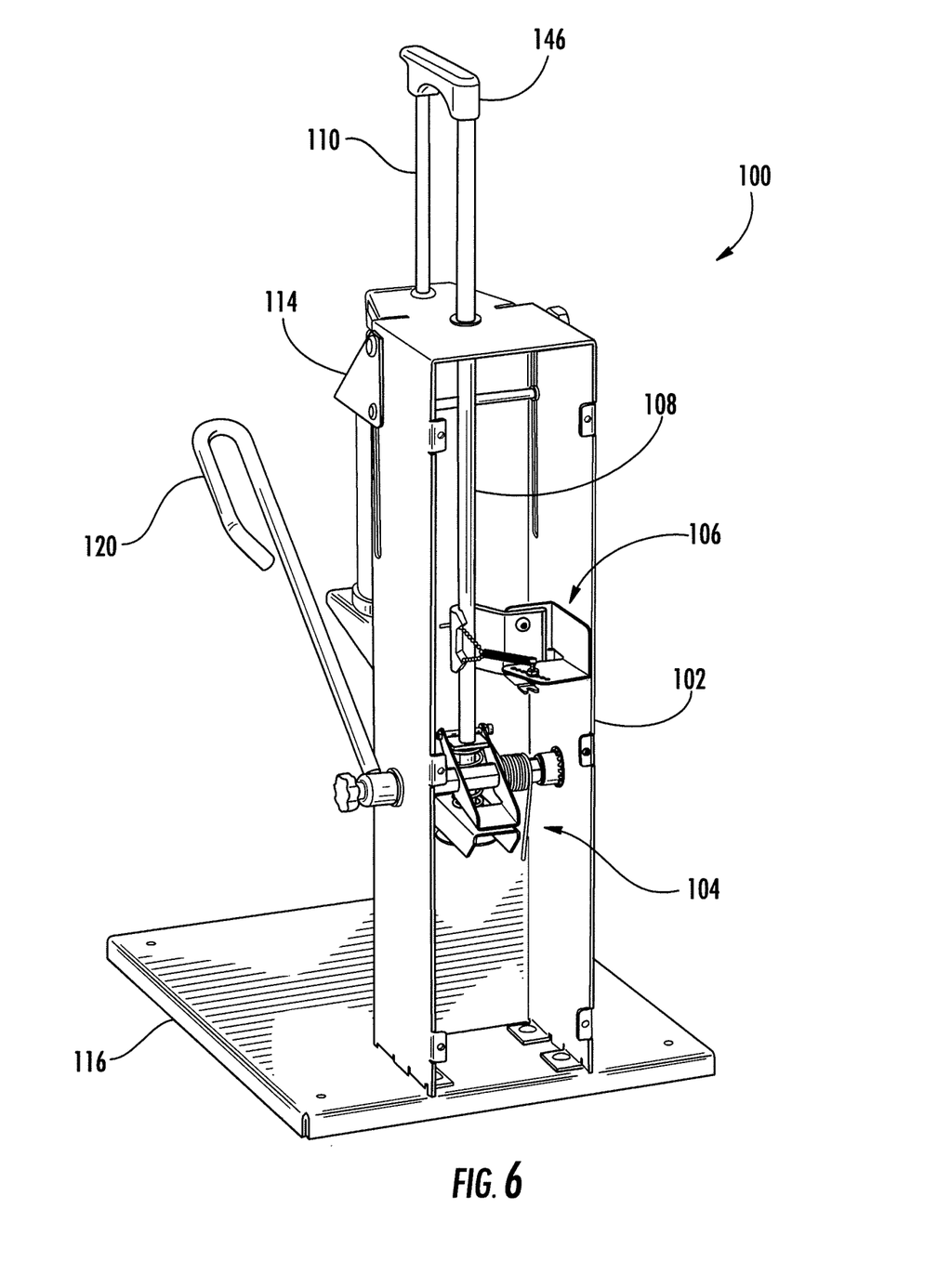
FIG. 6 is a rear perspective view of the assembly of FIG. 3, wherein a back panel of the housing is removed.
Figure 8:
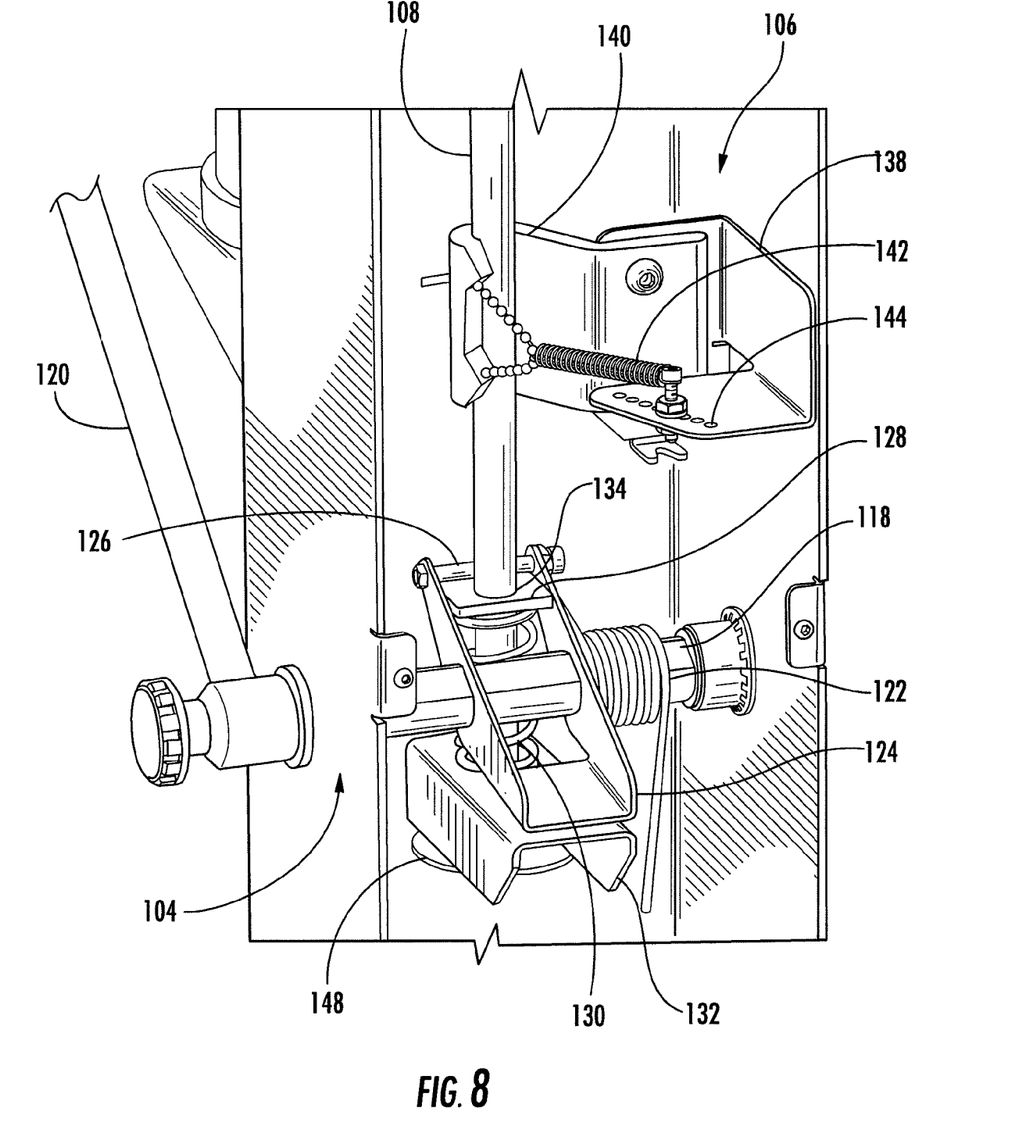
FIG. 8 is a rear perspective view of the assembly of FIG. 3, wherein a back panel of the housing is removed.

The biasing mechanism 130 may be compressed by the downward movement of the leverage plate 128 when the leverage plate 128 is in the engaged position. When the drive system 104 returns to the free position (i.e., when the driving force is removed from the dispensing mechanism 120), the downward force is removed from the leverage plate 128, and the biasing mechanism 130 decompresses so as to return the leverage plate 128 upward and to the free position. In some embodiments, the decompression of the biasing mechanism 130 may also assist in returning the drive frame 124 and the drive bar 126 to the free position. In some embodiments, such as illustrated in FIGS. 6-8, the biasing mechanism 130 helps maintain the drive system 104 in the free position when no intentional driving force is applied to the drive system 104. In the embodiments illustrated in FIGS. 6-8, the biasing mechanism 130 is a spring 130. One of ordinary skill in the relevant art will understand that examples of suitable biasing mechanisms 130 may include but are not limited to magnets, resilient materials such as rubber bands, and other suitable mechanisms.

The resistance mechanism 122 resists, but does not completely prohibit, the rotation of the axis member 118, and thereby the engagement of the drive system 104. In these embodiments, the resistance mechanism 122 may be coupled to either the drive bar 126, as shown in the embodiments illustrated in FIGS. 6-8, or another portion of the drive frame 124. Specifically, the resistance mechanism 122 resists the rotation of the axis member 118 so as to return the drive frame 124 and the drive bar 126 to the free position when a driving force is removed from the drive system 104 (i.e., when the drive system 104 transfers from an engaged position to the free position). In some embodiments, such as illustrated in FIGS. 6-8, the resistance mechanism 122 helps maintain the drive system 104 in the free position when no intentional driving force is applied to the drive system 104. In the embodiments illustrated in FIGS. 6-8, the resistance mechanism 122 is comprised of a coil spring 122 wrapped around the axis member 118, wherein a first end of the coil spring 122 is coupled to the drive bar 126 and a second end of the coil spring 122 is coupled to the housing 102. One of ordinary skill in the relevant art will understand that examples of suitable resistance mechanisms 122 may include but are not limited to magnets, resilient materials such as rubber bands, and other suitable mechanisms.

Those of ordinary skill in the relevant art, however, will recognize that the drive system 104 may comprise any number or configurations of the above or other known mechanisms and combinations thereof, whether mechanical, electrical or combinations thereof. Such mechanisms may include a ratchet mechanism, a compressed air pump mechanism, or other suitable mechanism, for example.

The brake assembly 106 may be configured to restrict the movement of the shaft 108. In some embodiments, such as those illustrated in FIGS. 6-8, the brake assembly 106 may interact with a length of the shaft 108. In use, the brake assembly 106 restricts the movement of the shaft 108 so as to maintain a position of the shaft 108 relative to the housing 102 while the drive system 104 is in the free position. In some embodiments, such as the embodiments illustrated in FIGS. 6-8, the brake assembly 106 may maintain the drive system 104 in the free position when no intentional driving force is applied to the drive system 104. In more simple terms, the brake assembly 106 prevents the downward movement of the shaft 108, and therefore the push rod 110 as explained in more detail below, absent the application of driving force to the drive system 104 in excess of the braking force applied by the brake assembly 106. Thus, as explained in more detail below, the brake assembly 106 prevents or limits unintentional dispensing by the assembly 100.

The brake assembly 106 may be mechanical, electrical, a combination thereof, or otherwise automated. For example, in the embodiments illustrated in FIGS. 6-8, the brake assembly 106 comprises a support bracket 138 and a friction surface 140. The support bracket 138 is coupled to the housing 102. In these embodiments, the support bracket 138 may be coupled to the housing 102 through a variety of mechanisms, including but not limited to an adhesive, bolts, fasteners, screws, and other coupling mechanisms. In other embodiments, the support bracket 138 may be integrally formed with the housing 102. The support bracket 138 may be formed from a variety of materials, including but not limited to aluminum, steel, other metallic materials, composite materials, plastics, or other similar materials.

The friction surface 140 is coupled to the support bracket 138 and extends therefrom so as to contact a length of the shaft 108. In some embodiments, such as the embodiments illustrated in FIGS. 6-8, the friction surface 140 may wrap around a portion of a circumference of the shaft 108. The friction surface 140 may apply a frictional force against a surface of the shaft 108 so as to combat the gravitational force acting upon the shaft 108. The friction surface 140 may be coupled to the support bracket 138 through a variety of mechanisms, including but not limited to an adhesive, bolts, fasteners, screws, and other coupling mechanisms. In other embodiments, the friction surface 140 may be integrally formed with the support bracket 138. The friction surface 140 may be formed from a variety of materials, including but not limited to sandpaper, felt, rubber, composite materials, plastics, or other similar materials that provide some type of friction.

In some embodiments, such as the embodiments illustrated in FIGS. 6-8, the brake assembly 106 may further comprise a tensioning mechanism 142. The tensioning mechanism 142 may provide increased braking force to the brake assembly 106. In some embodiments, such as the embodiments illustrated in FIGS. 6-8, the tensioning mechanism 142 may provide increased braking force to the brake assembly 106 by pulling the friction surface 140 against the shaft 108 so as to increase the frictional force applied by the friction surface 140 against the shaft 108. The tensioning mechanism 142 may be coupled on one end to the support bracket 138, and on another end to the friction surface 140. In these embodiments, the tensioning mechanism 142 may be coupled to the support bracket 138 and/or the friction surface 140 through a variety of mechanisms, including but not limited to bolts, fasteners, screws, and other coupling mechanisms. In some embodiments, such as the embodiments illustrated in FIGS. 6-8, the tensioning mechanism 142 may be adjustable, so as to be capable of imparting various magnitudes of tension. For example, in the embodiments illustrated in FIGS. 6-8, the tensioning mechanism 142 may be a spring 142 coupled to the support bracket 138 at a hole 144 of a plurality of holes 144. Each hole 144 is positioned at a different distance from the shaft 108, such that the coupling of the spring 142 to the support bracket 138 at a hole 144 further away from the shaft 108 will result in greater tension in the spring 142 and thus greater frictional force applied by the friction surface 140 to the shaft 108.

In some embodiments, the brake assembly 106 may be configured such that it may be adjusted or disengaged during use, such as when the drive system 104 is engaged, and readjusted or engaged when desired.

While the brake assembly 106 is generally described in the embodiments herein as being housed within the housing 102 so as to directly restrict the movement of the shaft 108, other embodiments exist in which the brake assembly 106 may be housed external to the housing 102. In these embodiments, such as the embodiments illustrated in FIG. 2, the brake assembly 106 may be configured to directly restrict the movement of the push rod 110. For example, in the embodiments illustrated in FIG. 2, the brake assembly 106 comprises a brake plate 107, which is pivotally coupled to the housing 102. In these embodiments, the brake assembly 106 may be configured to restrict the movement of the push rod 110 through the application of a manual force to the brake plate 107, thereby positioning the brake plate 107 against the push rod 110 so as to restrict the movement of the push rod 110 through the application of a frictional force upon the push rod 110. In these embodiments, the brake plate 107 may be formed from a variety of materials, including but not limited to aluminum, steel, other metallic materials, composite materials, rubber, plastics, or other similar materials. In these embodiments, the brake plate 107 may be pivotally coupled to the housing 102 through a variety of mechanisms, including but not limited to hinges, fasteners, and other suitable coupling mechanisms. In some embodiments, the brake plate 107 may be releasably coupled to the housing 102.

The drive system 104 acts upon the shaft 108, as explained above, to operate the filling station assembly 100. As illustrated in the embodiments of FIGS. 1-6, the shaft 108 is coupled to the push rod 110 so as to control the movement of the push rod 110. Thus, displacement of the shaft 108 by the drive system 104 within the housing 102 will result in corresponding displacement of the push rod 110, which exists outside of the housing 102. Similarly, restriction of the shaft 108 by the brake assembly 106 within the housing 102 will result in a corresponding restriction of the push rod 110 outside of the housing 102. Likewise, restriction of the push rod 110 by the brake assembly 106 will result in a corresponding restriction of the shaft 108. The shaft 108 may be formed from a variety of materials, including but not limited to aluminum, steel, other metallic materials, composite materials, plastics, or other similar materials. The push rod 110 may be formed from a variety of materials, including but not limited to aluminum, steel, other metallic materials, composite materials, plastics, or other similar materials. In some embodiments, the push rod 110 may lie substantially parallel to the shaft 108. In some embodiments the push rod 110 may be formed of one or more connected arms.

In these embodiments, the shaft 108 may be coupled to the push rod 110 through a variety of mechanisms, including but not limited to a connecting member 146, as illustrated in the embodiments of FIG. 1 for example. The connecting member 146 may be formed from a variety of materials, including but not limited to aluminum, steel, other metallic materials, composite materials, plastics, or other similar materials. In these embodiments, the connecting member 146 may be coupled to the shaft 108 and/or the push rod 110 through a variety of mechanisms, including but not limited to an adhesive, bolts, fasteners, screws, and other coupling mechanisms. In other embodiments, the shaft 108, push rod 110, and connecting member 146, may be integrally formed. In other embodiments, the shaft 108 and push rod 110 may be integrally formed. In some embodiments, the connecting member 146 may be shaped similar to a handle.

In some embodiments, the assembly 100 may further comprise the dispensing platform 112. The dispensing platform 112 is coupled to the housing 102 and may provide a resting surface for the dispensing container 202, as shown in the embodiments illustrated in FIGS. 2-5. In these embodiments, the dispensing platform 112 may have any suitable general surface shape that allows the dispensing container 202 to rest on the dispensing platform 112 while simultaneously allowing for the contents of the dispensing container 202 to travel from the dispensing container 202 to the dispenser 204 located below the dispensing platform 112, including but not limited to cylindrical, rectilinear, trapezoidal, or other similar polygon shape. In some embodiments, such as the embodiments illustrated in FIG. 1, the shape of the dispensing platform 112 may be configured to comprise cut-outs or holes. Such configurations may resemble the shape of the letter V, as illustrated in FIG. 1. The dispensing platform 112 may be formed from a variety of materials, including but not limited to aluminum, steel, other metallic materials, composite materials, plastics, or other similar materials. The dispensing platform 112 may be coupled to the housing 102 through a variety of mechanisms, including but not limited to an adhesive, bolts, fasteners, screws, and other coupling mechanisms. In some embodiments, the position of the dispensing platform 112 relative to the housing 102 may be adjustable.

In some embodiments, the assembly 100 may further comprise the holding bracket 114. The holding bracket 114 is coupled to the housing 102 and may provide alignment for the push rod 110. The holding bracket 114 may be formed from a variety of materials, including but not limited to aluminum, steel, other metallic materials, composite materials, plastics, or other similar materials. The holding bracket 114 may be coupled to the housing 102 through a variety of mechanisms, including but not limited to an adhesive, bolts, fasteners, screws, and other coupling mechanisms. In some embodiments, such as the embodiments illustrated in FIG. 1, the position of the holding bracket 114 relative to the housing 102 may be adjustable. In some embodiments, the holding bracket 114 may secure the position of the dispensing container 202.

FIGS. 2-8 illustrate embodiments of a filling station assembly 100 in conjunction with a dispensing container 202 and/or a dispenser 204. In some embodiments, the assembly 100 may also be used in conjunction with a removable nozzle 206. For example, as illustrated in the embodiments illustrated in FIG. 2, the removable nozzle 206 is coupled to a lid 208 of the dispensing container 202, which contains the semiliquid material. In some embodiments, the dispensing container 202 may be an EMP jar. However, one of ordinary skill in the relevant art will understand that examples of suitable dispensing containers 202 may include other known suitable containers. The removable nozzle 206 may be coupled to the lid 208 of the dispensing container 202 through a variety of mechanisms, including but not limited to screwing, snap-fitting, and other similar means. The dispensing container 202 is then placed in an inverted position on the dispensing platform 112, as illustrated in FIG. 2. In some embodiments, such as the embodiment illustrated in FIG. 2, the removable nozzle 206 may extend below the dispensing platform 112. The dispensing container 202 may then be aligned with the push rod 110. The holding bracket 114 may assist in such alignment. The configuration of the dispensing platform 112 may also assist in such alignment. The dispenser 204 may then be placed below the removable nozzle 206. In other embodiments, the nozzle 206 may not be required and the dispenser 204 may be placed below an aperture 209 in the lid 208 of the dispensing container 202. In the embodiment illustrated in FIG. 2, the dispenser 204 is a Topi-Click® dispenser 204, which is described in U.S. Pat. Nos. 7,213,994 and 7,303,348 to Phipps et al., both of which are hereby incorporated by reference in their entirety. However, a person of ordinary skill in the relevant art understands that other dispensers 204 may be also be used, including syringes, refillable tubes, and other similar types of dispensers.

Dispensing may be achieved by transitioning the filling station assembly 100 from the free position to an engaged position. Specifically, the assembly 100 may be engaged by the application of a downward force (e.g., a pull) to the dispensing mechanism 120 sufficient enough overcome any frictional force applied to the shaft 108 by the brake assembly 106, any resistance supplied by the biasing mechanism 130 of the drive system 104, and the resistance provided by the resistance mechanism 122, thereby engaging the drive system 104. As explained above, as a result of this driving force, the drive system 104 displaces the shaft 108 downward relative to the housing 102, which thereby displaces the push rod 110 downward toward the dispensing container 202. The push rod 110 subsequently contacts and applies a downward force to a compressible floor 203 of the dispensing container 202, which forces the contained semiliquid material to be dispensed through the removable nozzle 206 (or aperture 209 in the lid 208) and into the dispenser 204. Engagement of the drive system 104 thus transitions the shaft 108 and the push rod 110 from a rest position to an advanced position, in which the push rod 110 contacts the compressible floor 203 of the dispensing container 202.

In some embodiments, such as the embodiments illustrated in FIG. 2, a plunger 111 may be coupled to the push rod 110 such that the plunger 111 contacts the compressible floor 203 of the dispensing container 202. The plunger 111 may be formed from a variety of materials, including but not limited to aluminum, steel, other metallic materials, composite materials, plastics, or other similar materials. The plunger 111 may be coupled to the push rod 110 through a variety of mechanisms, including but not limited to an adhesive, suction, bolts, fasteners, screws, and other coupling mechanisms. In some embodiments, the cross-sectional surface area of the plunger 111 may be greater than that of the push rod 110 so as to exert greater pressure on the compressible floor 203 of the dispensing container 202.

Dispensing will continue so long the user applies sufficient force to the dispensing mechanism 120 so as to result in advancement of the shaft 108 and the push rod 110. When the user removes such force, the drive system 104 transitions to the free position, thereby completing the dispensing cycle. The resistance mechanism 122, and/or the biasing mechanism 130, will return the axis member 118, the dispensing mechanism 120, the drive frame 124, the drive bar 126, and the leverage plate 128 to their free positions. The shaft 108, however, will not move freely through the opening 134 of the leverage plate 128; rather, the position of the shaft 108 will remain substantially fixed due to the frictional force applied to the shaft 108 by the brake assembly 106. The brake assembly 106 will thus also maintain the push rod 110 in a substantially fixed position relative to the dispensing container 202. Thus, the brake assembly 106 will prevent or limit any unintentional dispensing after the dispensing cycle. The shaft 108 and the push rod 110 will also remain in the advanced position.

The drive system 104, however, will return to the free position as detailed above such that one or more additional dispensing cycles can be commenced. Because the brake assembly 106 has maintained the push rod 110 in the advanced position from the previous dispensing cycle, the user can resume dispensing immediately by engaging the drive system 104 (e.g., pulling of the dispensing mechanism 120). Viewing the additional dispensing cycle in the abstract, the rest position of the shaft 108 and the push rod 110 in the cycle will be the same position as the advanced position of the shaft 108 and the push rod 110 from the previous dispensing cycle. The user can complete and repeat as many dispensing cycles as required or desired.

When dispensing is complete, the user may reset the filling station assembly 100 by manually displacing the shaft 108 and push rod 110 upward to a rest position. In some embodiments, the shaft 108 may comprise a stop 148 coupled to an end of the shaft 108, such that upward displacement of the shaft 108 (and thereby push rod 110) is limited by the interaction of the stop 148 with the biasing platform 132 of the drive system 104, as illustrated in FIGS. 6-8. The stop 148 may be formed from a variety of materials, including but not limited to aluminum, steel, other metallic materials, composite materials, plastics, or other similar materials. The stop 148 may be coupled to the shaft 108 through a variety of mechanisms, including but not limited to an adhesive, suction, bolts, fasteners, screws, and other coupling mechanisms. In these embodiments, the stop 148 may have any suitable general surface shape that allows the stop 148 to contact the biasing platform 132 so as to limit the upward displacement of the shaft 108, including but not limited to cylindrical, rectilinear, trapezoidal, or other similar polygon shape.

In some embodiments, the filling station assembly 100 may comprise a marking or measuring system to assist the user in consistent dispensing throughout dispensing cycles. In other embodiments, the filling station assembly 100 may comprise a stop or other similar obstacle to assist the user in consistent dispensing throughout dispensing cycles.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A filling station assembly comprising:
   (a) a housing comprising a drive system and a brake assembly;
   (b) a shaft releasably coupled to the drive system and adjacent the brake assembly; and
   (c) a push rod coupled to the shaft;
   wherein the drive system comprises a leveraging plate that is configured to couple to the shaft so as to lower the shaft and the push rod from a rest position to an advanced position when a driving force is applied to the drive system; and
   wherein the brake assembly comprises:
      (i) a support bracket coupled to the housing;
      (ii) a friction surface coupled to the support bracket, wherein the friction surface is configured to maintain the shaft and the push rod in the advanced position when the driving force is removed from the drive system such that the shaft is released from the drive system, and wherein the friction surface is positioned to apply a frictional force against a surface of the shaft; and
      (iii) a tensioning mechanism comprising a first end and a second end, wherein the first end is coupled to the support bracket and the second end is coupled to the friction surface so as to increase the frictional force applied against the surface of the shaft by the friction surface.

2. The assembly of claim 1, wherein the drive system comprises a resistance mechanism, wherein the resistance mechanism is configured to automatically reset the drive system when the driving force is removed from the drive system such that the shaft is released from the drive system.

3. The assembly of claim 1, wherein the friction surface wraps around at least a portion of a circumference of the shaft.

4. The assembly of claim 1, wherein the brake assembly is adjustable.

5. The assembly of claim 1, further comprising at least one holding bracket coupled to the housing.

6. The assembly of claim 1, wherein the drive system comprises a dispensing mechanism.

7. The assembly of claim 1, further comprising a base coupled to the housing.

8. The assembly of claim 1, wherein the push rod is coupled to the shaft by a connecting member.

9. The assembly of claim 1, further comprising a plunger coupled to the push rod.

10. A filling station system comprising:
   (i) a filling station assembly comprising:
      (a) a housing comprising a drive system and a brake assembly;
      (b) a shaft releasably coupled to the drive system and adjacent the brake assembly;
      (c) a push rod coupled to the shaft; and
      (d) a dispensing platform coupled to the housing;
   (ii) a dispensing container comprising a compressible floor staged in an inverted position on the dispensing platform; and
   (iii) a dispenser staged below the dispensing platform;
   wherein the drive system comprises a leveraging plate that is configured to couple to the shaft so as to lower the shaft and the push rod from a rest position to an advanced position when a driving force is applied to the drive system; and
   wherein the brake assembly comprises:
      (i) a support bracket coupled to the housing;
      (ii) a friction surface coupled to the support bracket, wherein the friction surface is configured to maintain the shaft and the push rod in the advanced position when the driving force is removed from the drive system such that the shaft is released from the drive system, and wherein the friction surface is positioned to apply a frictional force against a surface of the shaft; and
      (iii) a tensioning mechanism comprising a first end and a second end, wherein the first end is coupled to the support bracket and the second end is coupled to the friction surface so as to increase the frictional force applied against the surface of the shaft by the friction surface.

11. The system of claim 10, wherein the dispensing container is an EMP jar.

12. The system of claim 11 further comprising a removable nozzle coupled to a lid of the EMP jar.

13. The system of claim 11, wherein the dispenser to be filled is a syringe or a refillable tube.

14. A method of filling a dispenser through the use of a filling station assembly comprising a housing comprising a drive system and a brake assembly comprising a support bracket coupled to the housing, a friction surface coupled to the support bracket, and a tensioning mechanism comprising a first end coupled to the support bracket and a second end coupled to the friction surface; a shaft; a push rod; and a dispensing platform, the method steps comprising:
   (i) staging a dispensing container comprising a compressible floor in an inverted position on the dispensing platform;
   (ii) staging a dispenser below the dispensing platform;
   (iii) applying a driving force to the drive system to lower the shaft and the push rod from a rest position to an advanced position, wherein the push rod applies a force to the compressible floor of the dispensing container; and
   (iv) removing the driving force from the drive system, which releases the shaft from the drive system, wherein the friction surface of the brake assembly applies a frictional force against a surface of the shaft to maintain the shaft and the push rod in the advanced position, and wherein the frictional force applied by the friction surface is increased b the tensioning mechanism.

15. The method of claim 14, wherein the dispenser to be filled is a syringe.

16. The method of claim 14, wherein the dispensing container is an EMP jar.

* * * * *